US005151212A

United States Patent [19]

Bell et al.

[11] Patent Number: 5,151,212

[45] Date of Patent: Sep. 29, 1992

[54] PEROXYGEN COMPOUND ACTIVATION

[75] Inventors: Jack H. Bell, West Paterson; Henry C. Zak, Great Notch; Dominick A. De Santis, Somerville, all of N.J.

[73] Assignee: The Belzak Corporation, Clifton, N.J.

[21] Appl. No.: 496,608

[22] Filed: Mar. 21, 1990

[51] Int. Cl.[5] .................... C09K 3/00

[52] U.S. Cl. .................... 252/186.38; 252/186.39; 252/186.41; 252/95

[58] Field of Search .................... 252/186.38, 186.39, 252/186.41

[56] References Cited

U.S. PATENT DOCUMENTS

| | | | |
|---|---|---|---|
| 3,901,819 | 8/1975 | Nakagawa et al. | 252/186.38 |
| 3,982,892 | 9/1976 | Gray | 252/186.38 |
| 4,075,116 | 2/1978 | Mesaros | 252/102 |
| 4,483,778 | 11/1984 | Thompson et al. | 252/186.38 |
| 4,728,455 | 3/1988 | Rerek | 252/186.38 |
| 4,755,318 | 7/1988 | Davies et al. | 252/109 |
| 4,800,038 | 1/1989 | Broze et al. | 252/95 |
| 4,978,470 | 12/1990 | Suzuki et al. | 252/174.12 |

OTHER PUBLICATIONS

Bowmans Chemicals, Ltd., BOWMANOL HT™ Technical Information Sheet, (Apr. 1964).

*Primary Examiner*—Richard D. Lovering
*Assistant Examiner*—Joseph D. Anthony
*Attorney, Agent, or Firm*—Lerner, David, Littenberg, Krmholz & Mentlik

[57] ABSTRACT

Peroxygen compositions of at least one peroxygen compound combined with at least one polyhydric activator compound having at least four carbon atoms, with the carbon atoms having at least one hydroxyl group bonded thereto, or a boron or aluminum derivative thereof. Solutions of at least one activated peroxygen compound prepared by dissolving in a common solvent therefor at least one peroxygen compound and at least one of the polyhydric activator compounds of the invention. Methods for preparing activated peroxygen compounds by dissolving in a common solvent at least one peroxygen compound and at least one of the polyhydric activator compounds of the invention. Methods for cleaning or bleaching substrates in need thereof by contacting the substrate with a solution of at least one activated peroxygen compound prepared by dissolving in a common solvent at least one peroxygen compound with at least one of the polyhydric activator compounds of the invention.

110 Claims, No Drawings

PEROXYGEN COMPOUND ACTIVATION

FIELD OF THE INVENTION

The present invention relates to the activation of peroxygen compounds to enhance the oxidizing capability of the peroxygen compounds, and, in particular, to polyhydric activator compounds for peroxygen compounds. The present invention includes peroxygen compositions containing the polyhydric activator compounds and solutions of activated peroxygen compounds prepared by dissolving the polyhydric activator compounds of the invention with peroxygen compounds in a common solvent therefor. The present invention also includes processes for activating peroxygen compounds by dissolution with one or more activator compounds of the invention in a common solvent, and further includes processes for bleaching or cleaning substrates in need thereof by contacting the substrate with solutions of the activated peroxygen compounds of the invention.

BACKGROUND OF THE INVENTION

A need exists for suitable non-chlorine bleaching compositions with better low temperature performance and enhanced oxidizing capability. The usefulness of chlorine compounds such as hypochlorites as bleaching compositions is well known, as are the disadvantages of using such compounds. Chlorine bleaching compositions are useful as color and stain removers in the laundering of clothing, the processing of textiles, the pulping of wood in paper making, and are also useful in general as cleaning compositions. However, chlorine bleaches cause damage to the color of the substrate to which they are applied, as well as the substrate itself, and, in addition, are also less acceptable to the environment.

Peroxygen compounds, such as hydrogen peroxide, alkali metal perborates, percarbonates, perphosphates, persilicates, persulfates, perpyrophosphates, peroxides and mixtures thereof have been developed as alternatives to chlorine bleaching compositions. However, compared to chlorine bleaching compositions, these materials have relatively poor oxidizing capability and perform unsatisfactorily as laundry bleaching compositions in aqueous solutions at temperatures below 140°F. and are unsatisfactory in general in other bleaching and cleaning applications. Typical laundry temperatures in the United States are between 60°-90° F. More efficiently oxidizing non-chlorine peroxygen compositions are required, capable of functioning as laundry bleaching compositions within this water temperature range, and demonstrating improved performance in other bleaching and cleaning applications.

One approach has been to combine the peroxygen compounds with an activator compound that, together with the peroxygen compounds, provide an activated peroxygen composition having greater oxidizing efficiency than the peroxygen compound alone. For example, U.S. Pat. No. 4,610,799 to Wilsboro discusses a number of well-known N-acyl and O-acyl peroxygen activator compounds, such as pentaacetyl glucose, tetraacetylglycol uril (TAGU) and tetraacetyl ethylene diamine (TAED). U.S. Pat. No. 3,901,819 to Nakagawa discloses the use as peroxygen activators of acetic acid esters of monosaccharides, disaccharides, sugar alcohols, internal anhydrides of sugar alcohols, or erythritol. Such compounds are also discussed in U.S. Pat. No. 4,800,038 to Broze. The acyl and acetic acid groups react with the peroxygen compounds in solution to form peracetic acid, a stronger oxidizer than the peroxygen compounds. Other activator compounds of interest are disclosed in U.S. Pat. Nos. 3,637,339 to Gray and 3,822,114 to Montgomery.

Another compound that has rapidly gained acceptance as a peroxygen activator is sodium nonanoyloxy benzenesulfonate (SNOBS), disclosed in U.S. Pat. No. 4,619,779 to Hardy.

The above activators suffer from one or more disadvantages, among which include instability when formulated, undue expense, and the inability to function as an activator for all peroxygen compounds. A stable, inexpensive peroxygen activator compound that is capable of activating all peroxygen compounds would be highly desirable.

SUMMARY OF THE INVENTION

Polyhydric compounds have been discovered that are capable of activating peroxygen compounds by reacting in a common solvent with the peroxygen compounds to form activated peroxygen compounds having improved oxidizing capability over equivalent solution concentrations of the peroxygen compounds alone. Unlike the prior art, it is not necessary to first form O-acyl or acetic acid ester derivatives of the activating compounds. According to one embodiment of the present invention, peroxygen compositions are provided combining at least one peroxygen compound with at least one of the aforesaid polyhydric activator compounds, which have at least four carbon atoms, with each of the carbon atoms having at least one hydroxyl group bonded thereto. This embodiment also includes boron and aluminum derivatives of the polyhydric activator compounds of the invention. However, instead of using aluminum or boron derivatives of the polyhydric activator compounds, the peroxygen compositions can optionally further include one or more compounds selected from boric acid, aluminum hydroxide and borates and aluminates of Groups I and II of the periodic chart, to form the aluminum and boron derivatives in situ.

When the peroxygen compositions of the present invention are dissolved in a common solution for both the peroxygen compounds and the polyhydric activator compounds, the compounds react to form a solution of activated peroxygen compounds, which solution has improved oxidizing capability compared to known peroxygen compound solutions of equivalent concentration. Therefore, according to another embodiment of the present invention, solutions of activated peroxygen compounds are provided, prepared by the process of dissolving at least one peroxygen compound with at least one polyhydric activator compound, or the boron or aluminum derivatives thereof, in a common solvent therefor, which activator compound has at least four carbon atoms having at least one hydroxyl group bonded thereto. According to another embodiment of this method, the solutions of activated peroxygen compounds are prepared by the process of dissolving at least one peroxygen compound with at least one polyhydric activator compound and one or more compounds selected from boric acid, aluminum hydroxide and borates and aluminates of Groups I and II of the periodic chart in a common solvent therefor.

The present invention also includes methods for activating peroxygen compounds and methods for bleaching or cleaning substrates in need thereof using the methods for activating peroxygen compounds of the present invention and the peroxygen compositions and activated peroxygen compounds of the present invention. Therefore, according to another embodiment of the present invention, methods are provided for activating peroxygen compounds by dissolving at least one peroxygen compound with at least one polyhydric activator compound, or aluminum and boron derivatives thereof, in a common solvent therefor, which polyhydric activator compound has at least four carbon atoms having at least one hydroxyl group bonded thereto. Again, instead of using aluminum and boron derivatives of the polyhydric activator compounds, the solutions of activated peroxygen compounds can be prepared by dissolving the peroxygen compound with the polyhydric activator compound and the aluminum and boron compounds. According to yet another embodiment of the present invention, methods are provided for bleaching or cleaning substrates in need thereof by contacting the substrate with a solution of at least one of the activated peroxygen compounds of the present invention.

Bleaching compositions in general remove unwanted color by oxidatively reacting with chromophores (color agents) in stains. Such stains can be affixed to substrates physically or chemically. Bleaching compositions with or without peroxygen activators must react with the stain either to remove the stain itself or its chromophores or to change by oxidation the color of the chromophore so that the color blends in with the substrate. While not being bound by any particular theory, it is believed that activators improve the performance of peroxygen compositions by either stabilizing the peroxygen component, changing the peroxygen component to a more reactive species, or increasing the affinity of the peroxygen component for the stain.

While the mechanism of the reaction between the peroxygen compounds and the polyhydric activator compounds of the present invention is not completely clear at this time, it is believed that, unlike the prior art, formation of peracids does not occur. Ceric sulfate titration methods have shown no formation of peracids in the reaction mixture, which is indicative that the inventive reaction mechanism differs from the mechanisms of the prior art. Other objects, features and advantages of the methods and compositions of the present invention will be more readily apparent from the detailed description of the preferred embodiment set forth below.

DETAILED DESCRIPTION OF THE PREFERRED EMBODIMENT

The present invention employs polyhydric compounds having at least four carbon atoms having at least one hydroxyl group bonded thereto as activator compounds for use with peroxygen compounds. Dissolving the peroxygen compound and the polyhydric activator compound in a common solvent therefor provides a solution of an activated peroxygen compound with greater oxidizing capability than equivalent solution concentrations of the peroxygen compound alone.

The polyhydric activator compounds can be used with any of the art-recognized peroxygen compounds. Such peroxygen compounds include hydrogen peroxide, alkali metal perborates, percarbonates, perphosphates, persilicates, persulfates, perpyrophosphates, peroxides and mixtures thereof. The polyhydric activator compounds of the present invention can also be used with peroxyacid bleaching compounds such as diperoxydodecanedioic acid and the like, and with mixtures of the aforesaid peroxygen compounds and chlorine bleaching compounds for end use applications in which it is desirable to reduce but not eliminate the concentration of chlorine. The polyhydric activator compounds will activate the peroxygen compounds but will not interact with the chlorine compounds. The polyhydric activator compounds alone are sufficient to enhance the oxidizing capability of peroxygen compounds; however, the polyhydric compounds can also be used in combination with the known peroxygen activators of the prior art.

Any polyhydric compound having at least four carbon atoms having at least one hydroxyl group bonded thereto is suitable for use as an activator compound in the present invention. As will be readily apparent to those of ordinary skill in the art, the polyhydric compound should be selected so that it is soluble with the peroxygen compound in the solvent selected under end use conditions. For example, if the polyhydric activator compound and peroxygen compound are to be added together in dry form to cold laundering water, then the polyhydric activator compound selected should be readily soluble in cold laundering water, that is water having a temperature between 60° and 90° F.

As a matter of clarification, the definition of the polyhydric activator compound as having at least four carbon atoms having at least one hydroxyl group bonded thereto does not require all carbon atoms of an activator compound to have at least one hydroxyl group. Of the carbon atoms present, at least four must have at least one hydroxyl group bonded thereto. The carbon atoms meeting this definition may have two or more hydroxyl groups bonded thereto, and additional carbon atoms may be present without hydroxyl groups. Preferably, the polyhydric activator compounds will have at least six carbon atoms having at least one hydroxyl group bonded thereto. Polyhydric compounds having three or less carbon atoms having hydroxyl groups bonded thereto have not been found to enhance the oxidizing capabilities of peroxygen compounds.

Polyhydric activator compounds are also preferred that have at least two of the carbon atoms with at least one hydroxyl group bonded thereto adjacent to one another. Even more preferred is a polyhydric activator compound wherein substantially all carbon atoms having at least one hydroxyl group are adjacent to another carbon atom having at least one hydroxyl group.

Preferred polyhydric activator compounds include carbohydrate derivatives such as starch and cellulose hydrolysates, disaccharides and invertates thereof, monosaccharides, monosaccharide derivatives, pentaerythritol and mixtures thereof. Virtually, any disaccharide and its corresponding invertate is suitable for use as the polyhydric activator compound of the present invention. Typical disaccharides include sucrose, maltose and lactose, which are merely examples of suitable disaccharides and do not represent the only disaccharides suitable for use with the present invention. The listed disaccharides are considered preferable only because they are the most common and readily available of the disaccharides.

Any monosaccharide having at least four carbon atoms with at least one hydroxyl group bonded thereto is suitable for use with the present invention as an activator compound. Examples of suitable monosaccharides include glucose, fructose, mannose, xylose, galactose, ribose and ribulose. Again, the foregoing are merely examples of the most commonly available monosaccharides and do not represent the only monosaccharides suitable for use with the present invention. Instead, the present specification incorporates herein by reference as if fully set forth herein any and all monosaccharides having at least four carbon atoms with at least one hydroxyl group bonded thereto, disclosed in Lehninger, Biochemistry (2d Ed., Worth Publishers, New York 1976), Chapter 10, and in particular, those monosaccharides disclosed on pages 250–251.

Monosaccharide derivatives preferred for use as polyhydric activator compounds in the present invention include sugar alcohols and the internal anhydrides thereof and sugar acids and the derivatives thereof. Preferred sugar acid derivatives include sugar acid salts, sugar acid lactone derivatives, and acid ester and acid amide derivatives of sugar acids.

Any hydrogenated aldo or keto monosaccharide having at least four carbon atoms with at least one hydroxyl group bonded thereto is suitable for use as a sugar alcohol in the present invention. Typical of the suitable sugar alcohols are sorbitol, mannitol, inositol, erythritol and xylitol. Likewise, any sugar acid having at least four carbon atoms with at least one hydroxyl group bonded thereto is suitable for use as a polyhydric activator compound of the present invention. Typical sugar acids include glucaric acid, gluconic acid, glucuronic acid, glucoheptonic acid, fructoheptonic acid and erythorbic acid. Again, the foregoing are examples that are not intended to represent the only sugar alcohols, sugar acids, salts thereof and lactone, ester or amide derivatives thereof suitable for use with the present invention While the mechanism by which the foregoing polyhydric compounds function to activate peroxygen compounds is not clearly understood, it has been determined that all structural isomeric and stereoisomeric forms of a given polyhydric compound function equivalently as peroxygen compound activators. For example, the performance difference between alpha and beta glucose and the sugar alcohol and sugar acid derivatives thereof is insignificant, as is the performance difference between the D- and L- glucose isomers and the sugar alcohol and sugar acid derivatives thereof.

The manner in which mixtures of disaccharides, monosaccharides and the monosaccharide derivatives are prepared is unimportant. Many occur naturally or occur together as reaction products, such as the invertate monosaccharide mixtures produced by the hydrolysis of disaccharides. One advantage of the present invention is that it is not necessary to isolate a particular disaccharide, monosaccharide or monosaccharide derivative from a naturally occurring mixture of several such compounds, or a mixture produced as a reaction product. For example, carbohydrate-derived syrups containing various blends of fructose, glucose and sucrose are suitable for use in the present invention such as corn syrups, high fructose corn syrups and the like, as are other like mixtures derived from carbohydrate sources, including the aforementioned disaccharide invertates, such as the 50% fructose–50% glucose syrup resulting from the hydrolysis of sucrose. Furthermore, invertate mixtures may be used directly, or may first be formed into monosaccharide derivative mixtures Thus, sucrose invertate may be treated to form a mixture of glucoheptonic acid and fructoheptonic acid for use as polyhydric activator compounds in the present invention Of the disaccharides, sucrose is the more preferred polyhydric activator compound. Of the monosaccharides, glucose is the more preferred polyhydric activator compound. Of disaccharides, monosaccharides, monosaccharide derivatives and pentaerythritol, monosaccharide derivatives are more preferred polyhydric activator compounds.

With respect to the monosaccharide derivatives, of the sugar alcohols, sorbitol and inositol are preferred; and of these two, inositol is more preferred. Of the sugar acids, gluconic acid, erythorbic acid, glucoheptonic acid and fructoheptonic acid are preferred; glucoheptonic acid and fructoheptonic acid are more preferred and glucoheptonic acid is the most preferred.

Of the monosaccharide derivatives, the sugar acids and the derivatives thereof are the most preferred. Accordingly, among the more preferred polyhydric activator compounds is glucoheptonic acid. As noted above, both the alpha and beta forms of this and the other sugar acids are equally suitable. As noted earlier, the sugar acids may be used in their acid form, or an acid salt, lactone, acid ester or acid amide derivative may be used instead. Of the acid salts, lactones, acid esters and acid amide derivatives, acid salts are preferred. Sugar acids form salts with the Group I and Group II elements of the periodic chart. Of the Group I salts, sodium and potassium salts are more preferred and sodium salts are most preferred. Of the Group II salts, calcium and magnesium salts are more preferred. Between the Group I and Group II salts, Group I salts are more preferred. Accordingly, among the most preferred polyhydric activator compounds of the present invention is sodium glucoheptonate.

The polyhydric compounds of the present invention readily form boron and aluminum complexes upon reaction with boric acid, aluminum hydroxide and borates and aluminates of Group I and II of the periodic chart. Accordingly, among the more preferred polyhydric activator compounds of the present invention are sodium boron glucoheptonate and sodium aluminum glucoheptonate Hereinafter, unless specifically excluded, reference to the polyhydric activator compounds of the present invention includes the above-disclosed boron and aluminum derivatives thereof.

The weight ratio of polyhydric activator compound to peroxygen compound is not critical. In general, the oxidizing capability of the peroxygen compound increases as the ratio of polyhydric activator compound to peroxygen compound increases. The minimum amount of polyhydric activator compound is that ratio sufficient to produce an appreciable increase in the oxidizing capability of the peroxygen compound With respect to maximum quantities, eventually a limit will be reached above which the oxidizing capability of the peroxygen compound does not increase, and additional quantities of the polyhydric compound instead dilutes the peroxygen compound. Therefore, the maximum ratio of polyhydric activator compound to peroxygen compound is that ratio above which improved oxidizing capability compared to lower ratios does not result. More specifically, weight ratios of polyhydric activator compound to peroxygen compound between about 5:95 and 95:5 are suitable for use with the present invention Ratios between about 1:15 and about 5:1 are preferred, and ratios between about 1:10 and about 1:1 are even more preferred.

The polyhydric activator compounds and peroxygen compounds of the present invention must be dissolved in a common solvent in order for the polyhydric activator compound to enhance the oxidizing capability of the peroxygen compound. In solution, the two components interact to form an activated peroxygen compound, the solution of which has improved oxidizing capability compared to equivalent concentration solutions of the peroxygen compounds alone. The suitable solvents are polar in nature and include water, methanol, ethanol, glycerol, isopropanol and other such water soluble solvents and mixtures thereof. The most preferred solvent is water.

As disclosed earlier, the structure is not clearly understood of the activated peroxygen compounds of the present invention resulting from the interaction of the polyhydric activator compounds and the peroxygen compounds. What is clear, however, is that the activated peroxygen compound solutions can be prepared by dissolving one or more peroxygen compounds with one or more polyhydric activator compounds in a common solvent therefor.

The techniques associated with the method of preparing the activated peroxygen compounds of the present invention are well known and may vary somewhat depending upon the specific end use application, without departing from the essential parameters relating to dissolving one or more polyhydric activator compounds with one or more peroxygen compounds in a common solvent therefor. Such other details are provided for purposes of illustration and to provide a best mode for the practice of the invention, and therefore the invention should not be limited to those parameters.

The activated peroxygen compounds of the present invention may be prepared in situ by dissolving at least one polyhydric activator compound with at least one peroxygen bleaching compound in a common solvent prior to bleaching of a substrate in need thereof with the solution. Alternatively, because the activated peroxygen bleaching compounds of the invention are quite stable, concentrated solutions of activated peroxygen compounds can be prepared in advance for bleaching or cleaning of substrates in need thereof. The concentrated solutions can be used at full strength or may be diluted depending upon the requirements of the end use application. The concentrated solutions can also be spray-dried for use in powdered form. For preparation of the activated peroxygen compound in situ, the polyhydric activator compound and the peroxygen compound may be dry-blended by conventional means. Such conventional means may include milling of the components or spray-drying solutions of the individual components in order to obtain powders of suitably dispersible particle size.

The aluminum or boron derivatives of the polyhydric activator compounds can be prepared prior to combining the activator compound with the peroxygen bleaching compound, or the aluminum or boron derivative may also be formed in situ when the polyhydric activator compounds are combined with peroxygen bleaching compounds in a common solvent. For advance preparation, the boron or aluminum compounds may be dissolved with the polyhydric compound in one or more of the above common solvents, preferably water, and then dried, either by evaporation, spray-drying or other conventional means. For preparation of the derivative in situ, the compounds of boron or aluminum, the peroxygen compounds and the polyhydric activator compounds may be dry-blended by conventional means, which may also include milling of the components or spray-drying solutions of the individual components.

As stated above, the suitable boron and aluminum compounds include boric acid, aluminum hydroxide and borates and aluminates of Group I and Group II of the periodic chart. Preferred compounds include boric acid and borax (sodium borate tetrahydrate). Molar ratios of polyhydric activator compound to the boron and aluminum compounds between about 1:10 and about 10:1 are preferred and ratios between about 1:2 and about 5:1 are even more preferred.

In addition to the materials described thus far, compositions of the invention can be combined with other optional additives suited for use with the end use application. The optional additives may be dry-blended with the combination of the one or more polyhydric activator compounds and the one or more peroxygen compounds, or added to the activated peroxygen compound solutions.

For example, in laundry bleach end use applications, the dry-blend of the one or more polyhydric activator compounds and the one or more peroxygen compounds or the solution of the activated peroxygen compound may be used separately with a laundry detergent, or, alternatively, conventional laundry detergent ingredients may be added to the dry-blend or the solution to provide a combination laundry detergent and activated peroxygen bleach composition. Similar combinations are available for other end use applications of the present invention.

The dry-blend of at least one polyhydric activator compound and at least one peroxygen compound, the solution of activated peroxygen compounds and the method for preparing solutions of activated peroxygen compounds of this invention may be used for bleaching or cleaning substrates in need thereof. A substrate in need thereof may be bleached or cleaned by contacting the substrate with a solution of one or more of the activated peroxygen compounds of the present invention prepared by dissolving at least one peroxygen compound with at least one polyhydric activator compound in a common solvent therefor. Depending upon the end use application, the solution concentration of the one or more activated peroxygen compounds should be at a minimum about 1 ppm. Concentrated pastes containing as much as 95% of the one or more activated peroxygen compounds can also be used. For laundering end use applications, the solution concentration of one or more of the activated peroxygen compounds of the present invention should be between about 100 and about 8,000 ppm and preferably between about 500 and about 3,500 ppm.

The required concentration of the activated peroxygen compound solution may be prepared by dissolving an appropriate quantity of one or more polyhydric activator compounds and one or more peroxygen compounds in the desired quantity of the common solvent. As disclosed above, the two components may be dry-blended in advance for convenience. Alternatively, a concentrated solution of the activated peroxygen compound may be used full strength, if necessary, or an appropriate quantity may be diluted with the required quantity of solvent.

The improvement obtained in the oxidizing capability of peroxygen compounds provided by the interaction with the polyhydric activator compounds of the present invention expands the field of use for peroxygen compounds to replace hypochlorites in bleaching and other hypochlorite applications where the peroxygen compounds were previously considered too inefficient or ineffective because of their weak oxidizing capability compared to hypochlorites. The combination of the peroxygen compounds and polyhydric activator compounds of the present invention, and the activated peroxygen compound solutions resulting therefrom, are suitable for use as color and stain removers and sanitizers in the laundering of clothing, the processing of textiles, the pulping of wood in paper making are also suitable for various cleaning applications in general.

As stated previously, useful products can be prepared in either dry form with the peroxygen compounds and polyhydric activator compounds for addition to a solvent, or in concentrated liquid form with the activated peroxygen compound solution for full-strength use or dilution with solvent, and additional optional ingredients may also be included, depending upon the requirements of the product. The products include laundry formulations such as pre-soaks, stain removers, cleaning enhancers and combination detergent-bleaches. The compositions of the invention can also be formulated as an all-fabric oxygen bleach for use alone or in combination with a detergent. The all-fabric bleach can either be in the form of a dry blend of the peroxygen compound and the polyhydric activator compound, or in the form of a concentrated solution of the activated peroxygen compound. A powdered all-fabric bleach can also be prepared by spray-drying the concentrated solution of the activated peroxygen compound. Both the dry and liquid forms can optionally include absorbant carriers, coatings and other conventional ingredients for improving and stabilizing the storage and dispersion properties of the compositions. The laundry compositions of the invention also contribute detergency boosting and fabric softening properties to the laundering compositions.

The compositions of the invention are also suitable for formulation in kitchen cleansers, floor cleansers, hand and mechanical dishwashing products, hard surface cleansers in general, carpet and upholstery cleansers, spot removers and deodorizers, basin, tub and toilet bowl cleansers and sanitizers for the bathroom, algae removers and surface cleansers and sanitizers for pools and patio tiles, garbage and trash can cleansers and sanitizers, stain removers for plastic ware, coffee pots, flatware, stoneware, china and the like, cleansers for driveways and other concrete surfaces, denture cleansers, refrigerator cleansers, sanitizers and deodorizers, mold inhibitors and industrial cleaning compounds. The foregoing products are listed to illustrate expanded fields of use for peroxygen compounds provided by the present invention and are not intended to be limiting of the applications in which the compositions of the present invention are suitable replacements for hypochlorite and other chlorine bleaching and cleaning compounds. The following examples are given to illustrate the invention, but are not deemed to be limiting thereof. All percentages given throughout the specification are based upon weight, unless otherwise indicated.

EXAMPLES

In the examples that follow, cleaning compositions were prepared that were subjected to the tests described below:

STAIN REMOVAL

Three inch by four inch sections on the same piece of 100% cotton test fabric were spotted with ketchup, wine, coffee and tea. The stains were allowed to dry before the test. The cloth was soaked overnight in water containing 10 grams of a predetermined ratio of a peroxygen compound and an activator compound per 5 quarts of water. The water starting temperature was about 90° F., which then cooled to room temperature.

LAUNDRY TEST

A standard sized load of like colored clothing was washed on permanent press cycle in approximately 90° F. water to which was added 40 grams of a predetermined ratio of a peroxygen compound and an activator compound and ⅓ cup REGULAR LIQUID TIDE® laundry detergent. The detergent and peroxygen compounds were first dissolved in the water, the clothes were then added and the cycle started. When the cycle was completed, the clothes were dried and examined.

EXAMPLES 1-5

Experimental samples of alpha sodium glucoheptonate dihydrate (ASGD) activated monoperborate peroxygen compositions were prepared together with a control monoperborate sample according to the following weight ratios listed in Table I.

TABLE I

| Example | Monoperborate | Alpha Sodium Glucoheptonate Dihydrate |
|---|---|---|
| 1 | 1 | 0 |
| 2 | 3 | 1 |
| 3 | 4 | 1 |
| 4 | 5 | 1 |
| 5 | 7.6 | 1 |

The samples were evaluated as described above and the following results were obtained:

EXAMPLE 1

Overnight soaking in the stain test failed to remove the stains, which were slightly fainter than prior to soaking. Clothing washed in the laundry test were no cleaner than clothing washed alone with no peroxygen compound added.

EXAMPLE 2

In the stain test, overnight soaking removed all stains. In the laundry test, results were excellent, with the clothing cleaned white-white compared to Example 1.

EXAMPLE 3

In the stain test, the stains were almost completely removed after only 1½ hours soaking. Overnight, all stains were removed. In the laundry test, the results were very good, but not quite as good as Example 2.

EXAMPLE 4

In the stain test, after 1½ hours, the stains were almost completely removed. However, overnight soaking did not remove the stains any further Because the stains were not completely removed, the laundry test was not performed.

EXAMPLE 5

In the stain test, after 1 hour, there was little sign of stain removal. However, overnight soaking removed the stains to the extend of Example 4. The laundry test was performed, and the results were good. The clothing was laundered white, but not to the white-white extent of Example 2.

The foregoing examples establish that alpha sodium glucoheptonate dihydrate is an effective activator compound for monoperborates. The bleaching properties of the combination increases as the level of glucoheptonate increases, and the ratio of monoperborate to glucoheptonate decreases. While higher levels of glucoheptonate may provide even greater bleaching capability, superior results are already obtained by the 3:1 ratio of Example 2.

EXAMPLES 6-8

Experimental samples of ASGD activated percarbonate peroxygen compositions together with a control percarbonate sample were prepared according to the following weight ratios listed in Table II.

TABLE II

| Example | Percarbonate | Alpha Sodium Glucoheptonate Dihydrate |
|---|---|---|
| 6 | 1 | 0 |
| 7 | 3 | 1 |
| 8 | 5 | 1 |

The samples were evaluated as described above and the following results were obtained:

EXAMPLE 6

In the stain test, stain removal was very poor, even after soaking overnight Because the stain removal tests were so poor, the laundry test was not performed.

EXAMPLE 7

An improvement was detected in the stain test; however, the overnight results were still poor. In the laundry test, only slight improvement was observed over laundry washed without a peroxygen compound.

EXAMPLE 8

In the stain test, the stains were almost removed after 1½ hours soaking. Overnight, all stains were removed. In the laundry test, the results were very good, almost as clean and white as Example 2.

Examples 6-8 establish that glucoheptonate is also an effective activator for percarbonates. Unlike the monoperborate, the performance of glucoheptonate with percarbonate is maximized at a 5:1 ratio of percarbonate to glucoheptonate. Higher levels of glucoheptonate do not serve to increase the performance of the combination.

EXAMPLES 9-18

Experimental samples of monoperborate and percarbonate compounds activated with sorbitol, dextrose and inositol were prepared, along with a TAED activated monoperborate control. The peroxygen compound and activator compound combinations and the weight ratios of each are identified in Table III below:

TABLE III

| Example | Peroxygen Compound | Activator Compound |
|---|---|---|
| 9 | 3 Monoperborate | 1 Sorbitol |
| 10 | 3 Percarbonate | 1 Sorbitol |
| 11 | 5 Percarbonate | 1 Sorbitol |
| 12 | 3 Monoperborate | 1 Dextrose |
| 13 | 3 Percarbonate | 1 Dextrose |
| 14 | 3 Monoperborate | 1 Inositol |
| 15 | 5 Monoperborate | 1 Inositol |

TABLE III-continued

| Example | Peroxygen Compound | Activator Compound |
|---|---|---|
| 16 | 5 Percarbonate | 1 Inositol |
| 17 | 5 Monoperborate | 0.7 Dextrose<br>0.3 Inositol |
| 18 | 3 Monoperborate | 1 TAED |

The samples were evaluated as described above and the following results were obtained:

EXAMPLES 9 AND 10

The stain test was not performed. In the laundry test, these examples were only slightly better than non-activated peroxygen compounds.

EXAMPLE 11

The stain test was not performed. In the laundry test, the results were very good, with the clothing being white, but not the white-white of Example 2. The dried laundry did have a poor hand, however.

EXAMPLE 12

In the stain test, the stains were almost completely removed after one hour of soaking. What remained of the stains was removed by overnight soaking. In the laundry test, however, this example was only slightly better than non-activated peroxygen compounds.

EXAMPLE 13

The stain test was not performed. The laundry test was only slightly better than non-activated peroxygen compounds.

EXAMPLE 14

The stain test was not performed. The results of the laundry test were very good, with the clothing being white, but not the white-white of Example 2. The dried fabrics did have a good hand, however.

EXAMPLE 15

The stain test was not performed. The laundry test results were excellent, with the clothing being as white-white as Example 2.

EXAMPLE 16

The stain test was not performed. The laundry test results were also excellent, with the clothing being as white-white as Examples 2 and 15.

EXAMPLE 17

The stain test was not performed. The laundry test results were very good, with the clothing being white, but not as white-white as Examples 2, 15 and 16.

EXAMPLE 18

In the stain test, after two hours, the stains were mostly removed except for ketchup. After overnight soaking, the ketchup was still not removed, but the other stains were all removed. However, after drying, the fabric was not white and had a poor hand. In the laundry test, this control was no better than washing with detergent without peroxygen compounds.

Examples 9-18 establish that inositol is an effective activator for both monoperborates and percarbonates, even at lower levels of activator. Sorbitol and dextrose are also effective activators under certain circumstances. Sorbitol functions better as a percarbonate activator at lower levels in laundry applications. Dextrose functions better as a percarbonate activator in pre-soak applications. The performance of dextrose improves when used in combination with inositol. The activators still outperform TAED, which in the control example was used in combination with monoperborate because it is known to be a poorer activator of percarbonate.

EXAMPLES 19-20

Two experimental samples of monoperborate compounds activated with boron derivatives of sodium glucoheptonate were prepared. In both samples a blend of alpha and beta sodium glucoheptonate was used. In Example 19, four parts by weight of glucoheptonate was blended with one part by weight of boric acid. In Example 20, equal weight quantities of glucoheptonate and borax were blended. In each example, one part by weight of each mixture was blended with three parts by weight of monoperborate. The stain test was not performed for either example. In the laundry test, the results were good for both examples, but not as good as Examples 2, 15 and 16. The laundry of Example 20 was whiter than the laundry of Example 19. The boron derivatives of glucoheptonate therefore perform better than TAED, but not as well as glucoheptonate alone.

EXAMPLES 21 AND 22

Borax was blended with sodium alpha glucoheptonate dihydrate as in Example 20. One part by weight of this mixture was then blended with three parts of monoperborate in Example 21, and with three parts of percarbonate in Example 22. In the stain test, the stains were almost completely removed in Example 21 after two hours and were completely removed overnight. In Example 22, the stains were almost completely removed after one hour and were completely removed after three hours. In the laundry test, the results were excellent for both examples, with the laundry being as white-white as Examples 2, 15 and 16.

Examples 21 and 22 establish that borax-derived alpha boron glucoheptonate is a highly effective activator for both monoperborate and percarbonate peroxygen compounds.

The present invention therefore provides many simple, inexpensive and effective activators for peroxygen compounds that expand the fields of use in which hypochlorites can be replaced by peroxygen compounds. As can be readily appreciated, numerous variations and combinations of the features set forth above can be utilized without departing from the present invention as set forth in the claims. Such variations are not to be regarded as a departure from the spirit and scope of the invention, and all such modifications are intended to be included within the scope of the following claims.

We claim:

1. A peroxygen composition comprising:

(a) at least one peroxygen bleaching compound selected from the group consisting of peroxyacids and alkali metal peroxygen bleaching compounds; and (b) at least one polyhydric activator compound, substantially free of ester or ether hydroxyl group derivatives, said polyhydric activator compound having at least four carbon atoms, each of said carbon atoms having at least one hydroxyl group bonded thereto, wherein said polyhydric activator compound is uncomplexed or in the form of a metal complex, said metal being selected from the group consisting of boron and aluminum.

2. The peroxygen composition of claim 1, wherein said peroxygen compound is selected from the group consisting of peroxy acids and alkali metal perborates, percarbonates, perphosphates, persilicates, perpyrophosphates and peroxides.

3. The peroxygen composition of claim 2, wherein said peroxygen compound is selected from the group consisting of alkali metal perborates and percarbonates.

4. The peroxygen composition of claim 3, wherein said peroxygen compound is an alkali metal perborate.

5. The peroxygen composition of claim 1, wherein said polyhydric activator compound has at least six carbon atoms having at least one hydroxyl group bonded thereto.

6. The peroxygen composition of claim 1, wherein at least two of said carbon atoms having at least one hydroxyl group bonded thereto are adjacent to one another on said polyhydric activator compound.

7. The peroxygen composition of claim 6, wherein substantially all carbon atoms having at least one hydroxyl group are adjacent to another carbon atom having at least one hydroxyl group.

8. The peroxygen composition of claim 1, wherein said polyhydric activator compound is derived from carbohydrate sources.

9. The peroxygen composition of claim 8, wherein said carbohydrate sources are selected from the group consisting of corn syrups, and starch and cellulose hydrolysates.

10. The peroxygen composition of claim 8, wherein said carbohydrate sources are selected from the group consisting of disaccharides and invertates thereof, monosaccharides and derivatives thereof selected from the group consisting of sugar alcohols and internal anhydrides thereof, sugar acids and salts thereof, lactone derivatives thereof, acid esters thereof, acid amides thereof, and pentaerythritol.

11. The peroxygen composition of claim 10, wherein said disaccharides are selected from the group consisting of sucrose, maltose, and lactose.

12. The peroxygen composition of claim 10, wherein said disaccharide invertate is a 50%-50% blend of glucose and fructose prepared by hydrolyzing sucrose.

13. The peroxygen composition of claim 10, wherein said saccharides are selected from the group consisting of glucose, fructose, mannose, xylose, galactose, ribose and ribulose.

14. The peroxygen composition of claim 10, wherein sugar alcohols are selected from the group consisting of sorbitol, mannitol, inositol, erythritol and xylitol.

15. The peroxygen composition of claim 14, wherein said sugar alcohols are selected from the group consisting of sorbitol and inositol.

16. The peroxygen composition of claim 10, wherein said sugar acids are selected from the group consisting of glucaric acid, gluconic acid, glucuronic acid, glucoheptonic acid, fructoheptonic acid, erythorbic acid and mixtures thereof.

17. The peroxygen composition of claim 16, wherein said sugar acids are selected from the group consisting of glucoheptonic acid, fructoheptonic acid and mixtures thereof.

18. The peroxygen composition of claim 17, wherein said sugar acid is glucoheptonic acid.

19. The peroxygen composition of claim 16, wherein said sugar acid is a 50%-50% mixture of gluconic acid and fructoheptonic acid prepared from invertate of sucrose.

20. The peroxygen composition of claim 10, wherein said monosaccharide derivative is a sugar acid salt of Group I or II of the periodic chart.

21. The peroxygen composition of claim 20, wherein said sugar acid salt is a salt of a Group I metal selected from the group consisting of sodium and potassium.

22. The peroxygen composition of claim 21, wherein said sugar acid salt is a mixture of alpha and beta sodium glucoheptonate.

23. The peroxygen composition of claim 21, wherein said sugar acid salt is sodium alpha glucoheptonate.

24. The peroxygen composition of claim 21, wherein said sugar acid salt is sodium beta glucoheptonate.

25. The peroxygen composition of claim 1, wherein said polyhydric activator compound is uncomplexed and said composition further comprises a compound selected from the group consisting of boric acid, aluminum hydroxide, and borates and aluminates of Groups I and II of the periodic chart.

26. The peroxygen bleaching composition of claim 25, wherein said polyhydric activator compound is selected from the group consisting of sodium glucoheptonate, sorbitol and inositol.

27. The peroxygen bleaching composition of claim 1, wherein said polyhydric activator compound and said peroxygen compound are present in a weight ratio between about 5:95 and about 95:5.

28. The peroxygen bleaching composition of claim 27, wherein said ratio of said polyhydric activator compound to said peroxygen compound is between about 1:15 about 5:1.

29. The peroxygen bleaching composition of claim 28, wherein said ratio of said polyhydric activator compound to said peroxygen compound is between about 1:10 and about 1:1.

30. The peroxygen composition of claim 29, wherein said peroxygen compound is a perborate and said polyhydric activator compound is alpha sodium glucoheptonate dihydrate.

31. The peroxygen composition of claim 29, wherein said peroxygen compound is a percarbonate and said polyhydric activator compound is selected from the group consisting of alpha sodium glucoheptonate dihydrate, sorbitol and inositol.

32. The peroxygen composition of claim 29, wherein said peroxygen compound is a perborate and said polyhydric activator compound is inositol.

33. A solution comprising an activated peroxygen compound prepared according to a process comprising dissolving in a common solvent therefor, at least one peroxygen bleaching compound selected from the group consisting of peroxyacids and alkali metal peroxygen bleaching compounds and at least one polyhydric activator compound, substantially free of ester or ether hydroxyl group derivatives, said polyhydric activator compound having at least four carbon atoms, each of said carbon atoms having at least one hydroxyl group bonded thereto, wherein said polyhydric activator compound is uncomplexed or in the form of a metal complex, said metal being selected from the group consisting of boron and aluminum.

34. The solution of claim 33, wherein said peroxygen compound is selected from the group consisting of peroxy acids and alkali metal perborates, percarbonates, perphosphates, persilicates, perpyrophosphates and peroxides.

35. The solution of claim 34, wherein said peroxygen compound is selected from the group consisting of alkali metal perborates and percarbonates.

36. The solution of claim 35, wherein said peroxygen compound is an alkali metal perborate.

37. The solution of claim 33, wherein said polyhydric activator compound has at least six carbon atoms having at least one hydroxyl group bonded thereto.

38. The solution of claim 33, wherein at least two of said carbon atoms having at least one hydroxyl group bonded thereto are adjacent to one another on said polyhydric activator compound.

39. The solution of claim 38, wherein substantially all carbon atoms having at least one hydroxyl group are adjacent to another carbon atom having at least one hydroxyl group.

40. The solution of claim 33, wherein said polyhydric activator compound is derived from carbohydrate sources.

41. The solution of claim 40, wherein said carbohydrate sources are selected from the group consisting of corn syrups and starch and cellulose hydrolysates.

42. The solution of claim 40, wherein said carbohydrate sources are selected from the group consisting of disaccharides and invertates thereof, monosaccharides and derivatives thereof selected from the group consisting of sugar alcohols and internal anhydrides thereof, sugar acids and salts thereof, lactone derivatives thereof, acid esters thereof, acid amides thereof, and pentaerythritol.

43. The solution of claim 42, wherein said disaccharides are selected from the group consisting of sucrose, maltose, and lactose.

44. The solution of claim 42, wherein said disaccharide invertate is a 50%-50% blend of glucose and fructose prepared by hydrolyzing sucrose.

45. The solution of claim 42, wherein said saccharides are selected from the group consisting of glucose, fructose, mannose, xylose, galactose, ribose and ribulose.

46. The solution of claim 42, wherein said sugar alcohols are selected from the group consisting of sorbitol, mannitol, inositol, erythritol and xylitol.

47. The solution of claim 46, wherein said sugar alcohols are selected from the group consisting of sorbitol and inositol.

48. The solution of claim 42, wherein said sugar acids are selected from the group consisting of glucaric acid, gluconic acid, glucuronic acid, glucoheptonic acid, fructoheptonic acid, erythorbic acid and mixtures thereof.

49. The solution of claim 48, wherein said sugar acids are selected from the group consisting of glucoheptonic acid, fructoheptonic acid and mixtures thereof.

50. The solution of claim 49, wherein said sugar acid is glucoheptonic acid.

51. The solution of claim 48, wherein said sugar acid is a 50%-50% mixture of gluconic acid and fructoheptonic acid prepared from invertate of sucrose.

52. The solution of claim 42, wherein said monosaccharide derivative is a sugar acid salt of Group I or II of the periodic chart.

53. The solution of claim 52, wherein said sugar acid salt is a salt of a Group I metal selected from the group consisting of sodium and potassium.

54. The solution of claim 53, wherein said sugar acid salt is a mixture of alpha and beta sodium glucoheptonate.

55. The solution of claim 53, wherein said sugar acid salt is sodium alpha glucoheptonate.

56. The solution of claim 53, wherein said sugar acid salt is sodium beta glucoheptonate.

57. The solution of claim 33, wherein said polyhydric activator compound is uncomplexed and said process of preparing said activated peroxygen compound further comprises the step of dissolving in said common solvent, with said peroxygen compound and said polyhydric activator compound, a compound selected from the group consisting of boric acid, aluminum hydroxide, and borates and aluminates of Groups I and II of the periodic chart.

58. The solution of claim 57, wherein said polyhydric activator compound is selected from the group consisting of sodium glucoheptonate, sorbitol and inositol.

59. The solution of claim 33, wherein said solvent is selected from the group consisting of water, ethanol, methanol, glycerol, isopropanol and mixtures thereof.

60. The solution of claim 59, wherein said solvent comprises water.

61. The solution of claim 33, wherein said polyhydric activator compound and said peroxygen compound are present in a weight ratio between about 5:95 and about 95:5.

62. The solution of claim 61, wherein said ratio of said polyhydric activator compound to said peroxygen compound is between about 1:15 an about 5:1.

63. The solution of claim 62, wherein said ratio of said polyhydric activator compound to said peroxygen compound is between about 1:10 and about 1:1.

64. The solution of claim 63, wherein said peroxygen compound is a perborate and said polyhydric activator compound is alpha sodium glucoheptonate dihydrate.

65. The solution of claim 63, wherein said peroxygen compound is a percarbonate and said polyhydric activator compound is selected from the group consisting of alpha sodium glucoheptonate dihydrate, sorbitol and inositol.

66. The solution of claim 63, wherein said peroxygen compound is a perborate and said polyhydric activator compound is inositol.

67. A peroxygen composition comprising:

(a) at least one peroxygen bleaching compound; and (b) at least one polyhydric activator metal complex substantially free of ester or ether hydroxyl group derivatives, said polyhydric activator metal complex having at least four carbon atoms, each of said carbon atoms having at least one hydroxyl group bonded thereto, wherein said metal is selected from the group consisting of boron and aluminum.

68. The peroxygen composition of claim 67, wherein said peroxygen compound is selected from the group consisting of hydrogen peroxide, peroxy acids and alkali metal perborates, percarbonates, perphosphates, persilicates, perpyrophosphates and peroxides.

69. The peroxygen composition of claim 67, wherein said polyhydric activator metal complex has at least six carbon atoms having at least one hydroxyl group bonded thereto.

70. The peroxygen composition of claim 67, wherein at least two of said carbon atoms having at least one hydroxyl group bonded thereto are adjacent to one another on said polyhydric activator metal complex.

71. The peroxygen composition of claim 70, wherein substantially all carbon atoms having at least one hydroxyl group are adjacent to another carbon atom having at least one hydroxyl group.

72. The peroxygen composition of claim 67, wherein said polyhydric activator metal complex is derived from carbohydrate sources.

73. The peroxygen composition of claim 72, wherein said carbohydrate sources are selected from the group consisting of corn syrups and starch and cellulose hydrolysates.

74. The peroxygen composition of claim 72, wherein said carbohydrate sources are selected from the group consisting of disaccharides and invertates thereof, monosaccharides and derivatives thereof selected from the group consisting of sugar alcohols and internal anhydrides thereof, sugar acids and salts thereof, lactone derivatives thereof, acid esters thereof, acid amides thereof, and pentaerythritol.

75. The peroxygen composition of claim 74, wherein said disaccharides are selected from the group consisting of sucrose, maltose and lactose.

76. The peroxygen bleaching composition of claim 67, wherein said polyhydric activator metal complex and said peroxygen compound are present in a weight ratio between about 5:95 and about 95:5.

77. The peroxygen bleaching composition of claim 76, wherein said ratio of said polyhydric activator metal complex to said peroxygen compound is between about 1:15 and about 5:1.

78. The peroxygen bleaching composition of claim 77, wherein said ratio of said polyhydric activator metal complex to said peroxygen compound is between about 1:10 and about 1:1.

79. A solution comprising an activated peroxygen compound prepared according to a process comprising dissolving in a common solvent therefor, at least one peroxygen bleaching compound and at least one polyhydric activator metal complex substantially free of ester or ether hydroxyl group derivatives, said polyhydric activator metal complex having at least four carbon atoms, each of said carbon atoms having at least one hydroxyl group bonded thereto, wherein said metal is selected from the group consisting of boron and aluminum.

80. The solution of claim 79, wherein said peroxygen compound is selected from the group consisting of hydrogen peroxide, peroxy acids and alkali metal perborates, percarbonates, perphosphates, persilicates, perpyrophosphates and peroxides.

81. The solution of claim 79, wherein said polyhydric activator metal complex has at least six carbon atoms having at least one hydroxyl group bonded thereto.

82. The solution of claim 79, wherein said polyhydric activator metal complex has at least six carbon atoms having at least one hydroxyl group bonded thereto.

83. The solution of claim 82, wherein substantially all carbon atoms having at least one hydroxyl group are adjacent to another carbon atom having at least one hydroxyl group.

84. The solution of claim 79, wherein said polyhydric activator metal complex is derived from carbohydrate sources.

85. The solution of claim 84, wherein said carbohydrate sources are selected from the group consisting of corn syrups and starch and cellulose hydrolysates.

86. The solution of claim 84, wherein said carbohydrate sources are selected from the group consisting of disaccharides and invertates thereof, monosaccharides and derivatives thereof selected from the group consisting of sugar alcohols and internal anhydrides thereof, sugar acids and salts thereof, lactone derivatives thereof, acid esters thereof, acid amides thereof, and pentaerythritol.

87. The solution of claim 86, wherein said disaccharides are selected from the group consisting of sucrose, maltose and lactose.

88. The solution of claim 79, wherein said solvent is selected from the group consisting of water, ethanol, methanol, glycerol, isopropanol and mixtures thereof.

89. The solution of claim 79, wherein said polyhydric activator metal complex and said peroxygen compound are present in a weight ratio between about 5:95 and about 95:5.

90. The solution of claim 89, wherein said ratio of said polyhydric activator metal complex to said peroxygen compound is between about 1:15 and about 5:1.

91. The solution of claim 90, wherein said ratio of said polyhydric activator metal complex to said peroxygen compound is between about 1:10 and about 1:1.

92. A peroxygen bleaching composition comprising:

(a) at least one peroxygen bleaching compound; and (b) at least one polyhydric activator compound, substantially free of ester or ether hydroxyl group derivatives, said polyhydric activator compound being selected from the group consisting of disaccharides and invertates thereof, pentaerythritol, monosaccharides, sugar alcohols and the internal anhydrides of sugar alcohols, wherein said polyhydric activator compound is uncomplexed or in the form of a metal complex, said metal being selected from the group consisting of boron and aluminum.

93. The peroxygen compound of claim 92, wherein said peroxygen compound is selected from the group consisting of hydrogen peroxide, peroxy acids and alkali metal perborates, percarbonates, perphosphates, persilicates, perpyrophosphates and peroxides.

94. The peroxygen composition of claim 92, wherein said disaccharides are selected from the group consisting of sucrose, maltose and lactose.

95. The peroxygen composition of claim 92, wherein said saccharides are selected from the group consisting of glucose, fructose, mannose, xylose, galactose, ribose and ribulose.

96. The peroxygen composition of claim 92, wherein said sugar alcohols are selected from the group consisting of sorbitol, mannitol, inositol, erythritol and xylitol.

97. The peroxygen composition of claim 92, wherein said polyhydric activator compound is uncomplexed and said composition further comprises a compound selected from the group consisting of boric acid, aluminum hydroxide, and borates and aluminates of Groups I and II of the periodic chart.

98. The peroxygen bleaching composition of claim 92, wherein said polyhydric activator compound and said peroxygen compound are present in a weight ratio between about 5:95 and about 95:5.

99. The peroxygen bleaching composition of claim 98, wherein said ratio of said polyhydric activator compound to said peroxygen compound is between about 1:15 and about 5:1.

100. The peroxygen bleaching composition of claim 99, wherein said ratio of said polyhydric activator compound to said peroxygen compound is between about 1:10 and about 1:1.

101. A solution comprising an activated peroxygen compound prepared according to a process comprising dissolving in a common solvent therefor, at least one peroxygen bleaching compound and at least one polyhydric activator compound, substantially free of ester or ether hydroxyl group derivatives, said polyhydric activator compound being selected from the group consisting of disaccharides and invertates thereof, pentaerythritol, monosaccharides, sugar alcohols and the internal anhydrides of sugar alcohols, wherein said polyhydric activator compound is uncomplexed or in the form of a metal complex, said metal being selected from the group consisting of boron and aluminum.

102. The solution of claim 101, wherein said peroxygen compound is selected from the group consisting of hydrogen peroxide, peroxy acids and alkali metal perborates, percarbonates, perphosphates, persilicates, perpyrophosphates and peroxides.

103. The solution of claim 101, wherein said disaccharides are selected from the group consisting of sucrose, maltose and lactose.

104. The solution of claim 101, wherein said saccharides are selected from the group consisting of glucose, fructose, mannose, xylose, galactose, ribose and ribulose.

105. The solution of claim 101, wherein said sugar alcohols are selected from the group consisting of sorbitol, mannitol, inositol, erythritol and xylitol.

106. The solution of claim 101, wherein said polyhydric activator compound is uncomplexed and said process of preparing said activated peroxygen compound further comprises the step of dissolving in said common solvent, with said peroxygen bleaching compound and said polyhydric activator compound, a compound selected from the group consisting of boric acid, aluminum hydroxide, and borates and aluminates of Groups I and II of the periodic chart.

107. The solution of claim 101, wherein said solvent is selected from the group consisting of water, ethanol, methanol, glycerol, isopropanol and mixtures thereof.

108. The solution of claim 101, wherein said polyhydric activator compound and said peroxygen compound are present in a weight ration between about 5:95 and about 95:5.

109. The solution of claim 108, wherein said ratio of said polyhydric activator compound to said peroxygen compound is between about 1:15 and about 5:1.

110. The solution of claim 109, wherein said ratio of said polyhydric activator compound to said peroxygen compound is between about 1:10 and about 1:1.

* * * * *